United States Patent
Zhang et al.

(10) Patent No.: US 10,832,868 B2
(45) Date of Patent: Nov. 10, 2020

(54) THIN FILM CAPACITORS

(71) Applicant: The Penn State Research Foundation, University Park, PA (US)

(72) Inventors: Qiming Zhang, University Park, PA (US); Yash Thakur, University Park, PA (US); James Runt, University Park, PA (US); Tian Zhang, University Park, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 16/082,977

(22) PCT Filed: Feb. 17, 2017

(86) PCT No.: PCT/US2017/018307
§ 371 (c)(1),
(2) Date: Sep. 7, 2018

(87) PCT Pub. No.: WO2017/176371
PCT Pub. Date: Oct. 12, 2017

(65) Prior Publication Data
US 2019/0035556 A1 Jan. 31, 2019

Related U.S. Application Data (60) Provisional application No. 62/319,505, filed on Apr. 7, 2016.

(51) Int. Cl.
| | |
|---|---|
| *H01G 4/18* | (2006.01) |
| *H01G 4/20* | (2006.01) |
| *C08K 3/22* | (2006.01) |
| *C08K 3/38* | (2006.01) |
| *C08L 75/02* | (2006.01) |
| *C08L 79/08* | (2006.01) |
| *C08L 81/06* | (2006.01) |
| *H01G 4/33* | (2006.01) |

(52) U.S. Cl.
CPC .............. *H01G 4/18* (2013.01); *C08K 3/22* (2013.01); *C08K 3/38* (2013.01); *C08L 75/02* (2013.01); *C08L 79/08* (2013.01); *C08L 81/06* (2013.01); *H01G 4/20* (2013.01); *H01G 4/33* (2013.01); *C08K 2003/2227* (2013.01); *C08K 2003/385* (2013.01); *C08K 2201/005* (2013.01); *C08L 2203/16* (2013.01)

(58) Field of Classification Search
None
See application file for complete search history.

(56) References Cited

U.S. PATENT DOCUMENTS

| 5,739,193 A | 4/1998 | Walpita et al. |
|---|---|---|
| 7,567,426 B2 | 7/2009 | Ko et al. |
| 8,248,755 B2 | 8/2012 | Yeager et al. |
| 2008/0097027 A1 | 4/2008 | Zhang et al. |
| 2010/0067172 A1 | 3/2010 | Zhang et al. |
| 2011/0228442 A1 | 9/2011 | Zhang et al. |
| 2011/0242729 A1 | 10/2011 | Silvi et al. |
| 2012/0081833 A1 | 4/2012 | Cao et al. |
| 2014/0080935 A1 | 3/2014 | Chen et al. |
| 2014/0226256 A1 | 8/2014 | Ichikawa et al. |
| 2014/0355173 A1 | 12/2014 | Odle et al. |

OTHER PUBLICATIONS

International Preliminary Report on Patentability issued in Application No. PCT/US2017/018307 dated Oct. 9, 2018.
Xie et al., "Polyimide/BaTiO3 composites with controllable dielectric properties," Composites: Part A: Applied Science and Manufacturing, vol. 36, Issue 8, Aug. 2005, p. 1152-1157.
International Search Report issued in Application No. PCT/US2017/018307 dated May 8, 2017.
Liu et al., "Preparation and dielectric properties of polyimide/silica nanocomposite films prepared from sol-gel and blending process," Polymers for Advanced Technologies, vol. 18, 2007, pp. 522-528.
Barrow et al., "Characterization of thick lead zirconate titanate films fabricated using a new sol gel based process," J. Appl. Phys., vol. 81, No. 22, Jan. 1997, pp. 876-881.

*Primary Examiner* — Robert T Butcher
(74) *Attorney, Agent, or Firm* — Troutman Pepper Hamilton Sanders LLP

(57) ABSTRACT

Dielectric capacitors including dielectric compositions with high dielectric constant, low dielectric loss, and high thermal stability are disclosed. The dielectric compositions can include a dipolar polymer having a high glass transition temperature (e.g., $T_g > 150°$ C.) in combination with either (i) another dipolar polymer having a high glass transition temperature (e.g., $T_g \geq 150°$ C.) in the form of a blend, or (ii) the dipolar polymer with an inorganic interfacial agent volume content less than 2 vol % in the dielectric composition.

10 Claims, 12 Drawing Sheets

Aromatic Polythiourea poly(arylene ether urea) (PEEU)

THIN FILM CAPACITORS

CROSS-REFERENCE TO RELATED APPLICATION

This application is the U.S. national stage of PCT/US2017/018307, filed Feb. 17, 2017, which claims the benefit of U.S. Provisional Application No. 62/319,505 filed Apr. 7, 2016 the entire disclosures of which are hereby incorporated by reference herein.

STATEMENT REGARDING FEDERALLY SPONSORED RESEARCH

This invention was made with government support under Contract No. N00014-14-1-0109, awarded by the Office of Naval Research. The Government has certain rights in the invention.

TECHNICAL FIELD

The present invention relates to dielectric film capacitors including dielectric compositions with high dielectric constants, low dielectric loss, and high thermal stability. The dielectric composition can include a dipolar polymer having a high glass transition temperature (e.g., $T_g>150°$ C.) in combination with either (i) another dipolar polymer having a high glass transition temperature (e.g., $T_g \geq 150°$ C.) in the form of a blend, or (ii) the dipolar polymer with no more than 2 volume percentage of an interfacial agent in the dielectric composition.

BACKGROUND

Capacitors are critical components of many pulsed power systems, power electronics, and signal processing devices, such as medical defibrillators, pulse forming networks, filters, switched-mode power supplies, and inverters in hybrid electric vehicles (HEV). Compared with ceramic and electrolytic capacitors, polymer film capacitors are inexpensive, can be used under high voltage, and fail gracefully with open circuit. Recent advancement in power electronics technology and the continuous miniaturization demands have significantly increased the power density and operating temperature in these electrical devices. Developing polymer dielectrics with high energy density, low loss, and high operating temperature capability is of great interest. Since the energy density $U_e$ of a polymer dielectric is directly proportional to the dielectric constant K, $$U_e = \tfrac{1}{2} K \varepsilon_0 E^2 \tag{1}$$

where $\varepsilon_0$ is the vacuum permittivity (=$8.85 \times 10^{-12}$ F/m) and E is the electric field, there has been great efforts in raising the dielectric constant of polymers, however, many of these attempts also cause the increase of dielectric loss.

SUMMARY OF THE DISCLOSURE

Advantages of the present disclosure include a dielectric capacitor with a dielectric composition having a high dielectric constant and a low dielectric loss and the dielectric composition in the form of a thin film.

These and other advantages are satisfied, at least in part, by a dielectric capacitor comprising a dielectric composition and the dielectric composition in the form of a thin film. The dielectric composition can be composed of either (i) a blend of at least two dipolar polymers, each having a high glass transition temperature (e.g., $T_g \geq 150°$ C.), or (ii) a dipolar polymer having a high glass transition temperature (e.g., $T_g \geq 150°$ C.) with an interfacial agent. Advantageously, the dielectric composition has a high dielectric constant, e.g. at least about 4.6, and a low dielectric loss, e.g., less than 2% such as less than 1.5% or no more than 1%. In some embodiments, the dielectric composition has a low dielectric loss less than 0.01 from $-50°$ C. to temperatures below the glass transition temperature of the dipolar polymer.

Embodiments include one or more of the following features individually or combined. For example, in some embodiments the blend of dipolar polymers having a high glass transition temperature has a dielectric constant that is at least 25% greater than the dielectric constants of each constituent dipolar polymer in the blend, e.g., the blend has a dielectric constant that is at least 30, 40%, 50% or 100% greater than the dielectric constants of the individual dipolar polymers comprising the blend.

In other embodiments, the dipolar polymer has a high dielectric constant, e.g., a K of at least 3.0. In further embodiments, the dipolar polymer is one or more of: meta-phenylene polyurea (meta-PU), poly(arylene ether urea) (PEEU), aromatic polyurea (ArPU), aromatic polythiourea (ArPTU), polycarbonate (PC), polyetheretherketone (PEEK), polyetherimide (PEI), polyimide (PI), polyether sulfone (PES), polyphenylsulfone (PPSU), polysulfone (PSU), polybenzimidazole (PBI), poly(phthalazinone ether ketone) (PPEK), or combinations thereof.

Advantageously, the interfacial agent is present as a small volume fraction of the dielectric composition. For example, the volume fraction of the interfacial agent, which is an electrical insulator, can be less than 2 vol %, e.g., less than 1 vol %, or no more than about 0.8 vol % or no more than about 0.5 vol % of the dielectric composition. The interfacial agent, which is an electrical insulator, can be one or more of: interfacial agents of dielectric insulators $Al_2O_3$, MgO, $ZrO_2$, BN, $SiO_2$, ZnO, $Ta_2O_5$, $TiO_2$, $HfO_2$, $HfSiO_4$, $La_2O_3$, $Y_2O_3$, or combinations thereof. Also useful interfacial agents of dielectric insulators include agents with higher dielectric constants such as: $BaTiO_3$, BSTZ $(Ba_{0.8}Sr_{0.2})(Ti_{0.9}Zr_{0.1})O_3$. The interfacial agents can also have an average size of no more than about 100 nm, such as no more than 50 nm, and no more than 40 nm.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein.

DETAILED DESCRIPTION OF THE DISCLOSURE

The present disclosure relates to dielectric capacitors comprising a dielectric composition. The dielectric capacitor can include electrical conductors separated by the dielectric composition. The dielectric composition can include either (i) a blend of at least two different dipolar polymers, each having a high glass transition temperature (e.g., $T_g \geq 150°$ C.), or (ii) a dipolar polymer having a high glass transition temperature (e.g., $T_g \geq 150°$ C.) with an inorganic interfacial agent, which is an insulator.

In certain embodiments, the dielectric composition, e.g., the blend or the dipolar polymer and interfacial agent, has a dielectric constant that is at least 25% greater than the dielectric constant of any constituent dipolar polymer in the dielectric composition, e.g., the blend or dielectric composition modified with an interfacial agent has a dielectric constant that is at least 30%, 40%, 50% or 100% greater than the dielectric constant of any individual dipolar polymer comprising the blend or dielectric composition modified with an interfacial agent.

Dielectric compositions with high dielectric constants enable high energy density while such compositions with low loss reduce the dielectric heating during operation of a capacitor. More specifically, the present disclosure relates to a class of high glass transition ($T_g$) dipolar polymer blends and high glass transition ($T_g$) dipolar polymer/interfacial agent compositions in which the dielectric constant can be increased markedly compared to the constituent dipolar polymer(s) while maintaining a low dielectric loss at temperatures below $T_g$. It is believed that the dielectric compositions of the present disclosure achieve high dielectric constants with low loss through interfacial/interphase effects such as the excess free-volume effect in the glass phase of the polymer.

The class of the high temperature dipolar polymers have a high glass transition temperature $T_g \geq 150°$ C., e.g., greater than 170° C., so that they can be operated at high temperatures (>130° C., which is more than 40° C. below $T_g$), which can significantly reduce the reliance of the capacitors on the external cooling systems. In general, these polymers are dipolar polymers and preferably have a dielectric constant of at least 3.0. Useful dipolar polymers of the present disclosure include one or more of: meta-phenylene polyurea (meta-PU), poly(arylene ether urea) (PEEU), aromatic polyurea (ArPU), aromatic polythiourea (ArPTU), polycarbonate (PC), polyetheretherketone (PEEK), polyetherimide (PEI), polyimide (PI), polyether sulfone (PES), polyphenylsulfone (PPSU), polysulfone (PSU), polybenzimidazole (PBI), poly(phthalazinone ether ketone) (PPEK), or combinations thereof. In some embodiments, dipolar polymers of the present invention can have dipoles such as thiourea and urea in the polymer chains.

Commercial dipolar polymers with high glass transition temperatures and low loss (loss tangent<1%) have their dielectric constant less than 3.5 at temperatures below $T_g$, examples are list in Table 1 below.

TABLE 1

Examples of commercial dipolar polymers of high $T_g$, low dielectric loss (<1%), and high $T_g$

| Polymers | $T_g$ | Diel. constant | Diel. loss | Density (room temp.) |
|---|---|---|---|---|
| Polycarbonate (PC) | 145° C. | 3.0 | .13% | 1.20 g/cm³ |
| Polyetheretherketone (PEEK) | 157° C. | 3.2 | .40% | 1.32 g/cm³ |
| Polysulfone (PSU) | 190° C. | 3.1 | .08% | 1.24 g/cm³ |
| Polyetherimide (PEI) | 217° C. | 3.2 | .20% | 1.27 g/cm³ |
| Polyether sulfone (PES) | 220° C. | 3.5 | .20% | 1.37 g/cm³ |
| Polyphenylsulfone (PPSU) | 220° C. | 3.4 | .09% | 1.33 g/cm³ |
| Polyimide (PI) | 385° C. | 3.3 | .20% | 1.42 g/cm³ |
| Polybenzimidazole (PBI) | 400° C. | 3.4 | .30% | 1.30 g/cm³ |
| Poly(phthalazinone ether ketone) | 250° C. | 3.5 | .63% | — |

In dipolar polymers, it is well known that as the temperature increases to above $T_g$, there is a large increase in the dielectric constant, owing to the creation of "free volume" around the dipoles. For example, polyurethane shows a low dielectric constant but also a low loss. Another example, Polyvinyl Chloride (PVC), a simple polymer glass, has low temperature dielectric constant at ca. 3 and low loss at temperature below $T_g$. On the other hand, these polymers exhibit a large increase in dielectric constant after undergoing a glass transition at $T_g$, e.g., K>6 for polyurethane and K>9 for PVC. The penalty is that the dielectric loss is also increased markedly (loss>5%). The large increase in the dielectric constant observed above $T_g$ in these strongly dipolar polymers is attributed to an increase of the empty spaces surrounding the dipoles termed "free-volume effect" which makes it easier for dipoles to follow the applied field, and hence reach a higher dielectric constant. However, large-chain-segment motions above $T_g$, which have long relaxation times, also causes high dielectric loss. Now the question is whether the "excess free volume" can also exist in dipolar polymers at temperatures below $T_g$, thus leading to high K while avoiding large-chain-segment motion causing dielectric loss. If $T_g$ is at a high temperature (for example, $T_g$>170° C.), the polymer can also have a high operating temperature (>130° C.) which can significantly reduce the reliance of capacitors on external cooling (in general, capacitors will heat up during operation. External cooling is required to prevent the thermal runaway of the capacitors). Recently, we showed that in several high $T_g$ dipolar polymers, such as meta-phenylene polyurea (meta-PU) and poly(arylene ether urea) (PEEU), such free volume effect indeed exists at temperatures below $T_g$. The relatively high dielectric constant (K=5.7 for meta-PU and 4.7 for PEEU in the glass phase) of these dipolar polymers are in fact caused by the excess free-volume effect in the glass phase, due to their polymer molecular structures. The excess "free volume" in the glass phase causes slight increase of the inter-chain spaces, reducing the resistance of the glass structure on the dipole reorientations under external electric fields. This disclosure is related to employing nano-structure engineering to further enhance this excess "free volume" effect, thus leading to dielectric compositions having a high dielectric constant with low loss.

In an aspect of the present disclosure, a dielectric composition comprising a blend of at least two different dipolar polymers exhibits high dielectric constant, low dielectric loss, and high thermal stability. High dielectric constant enables high energy density while low loss reduces the dielectric heating during operation. Moreover, the high $T_g$(≥150° C., e.g., >170° C.) of the polymer films allows the film capacitors operating at high temperatures (even without cooling).

Figure 1:
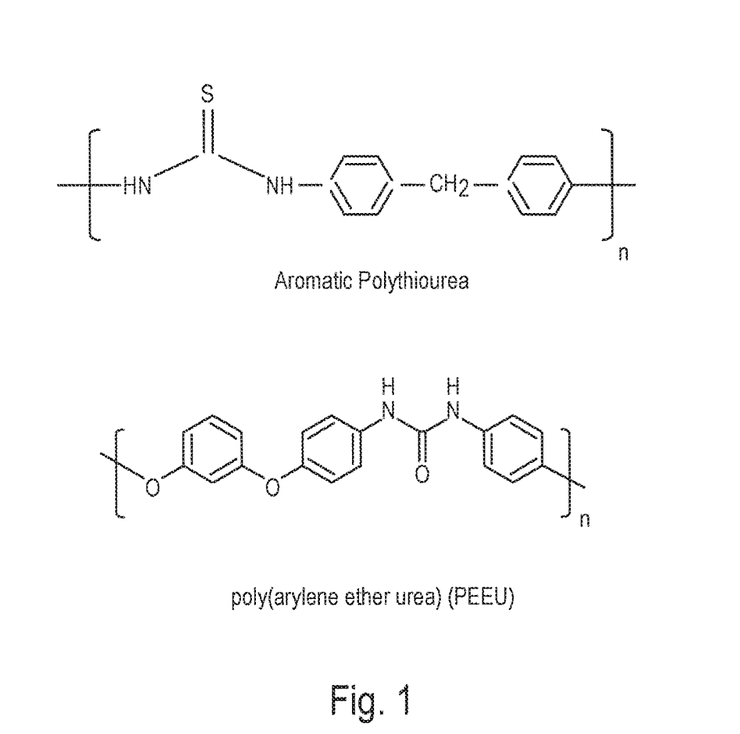
FIG. 1 shows molecular structures of ArPTU and PEEU.

The dielectric compositions in the form of a blend of the present disclosure can achieve high dielectric constants while maintaining a low loss and high operating temperature (thermal stability). It is believed that the advantageous properties of such blends are a result of an increase in the free-volume in the inter-phase-regions of the blend. In polymers, blending two polymers together may create nano-inter-phase (nano-interface) regions between two polymers with dissimilar polymer chains, thus, creating free-volume in the inter-phase-regions. The free-volume created by the large nano-inter-phase areas in the blend may lead to a high dielectric constant with a low loss. This effect is indeed realized in the blend of PEEU and ArPTU (see molecular structure in FIG. 1).

Figure 2:
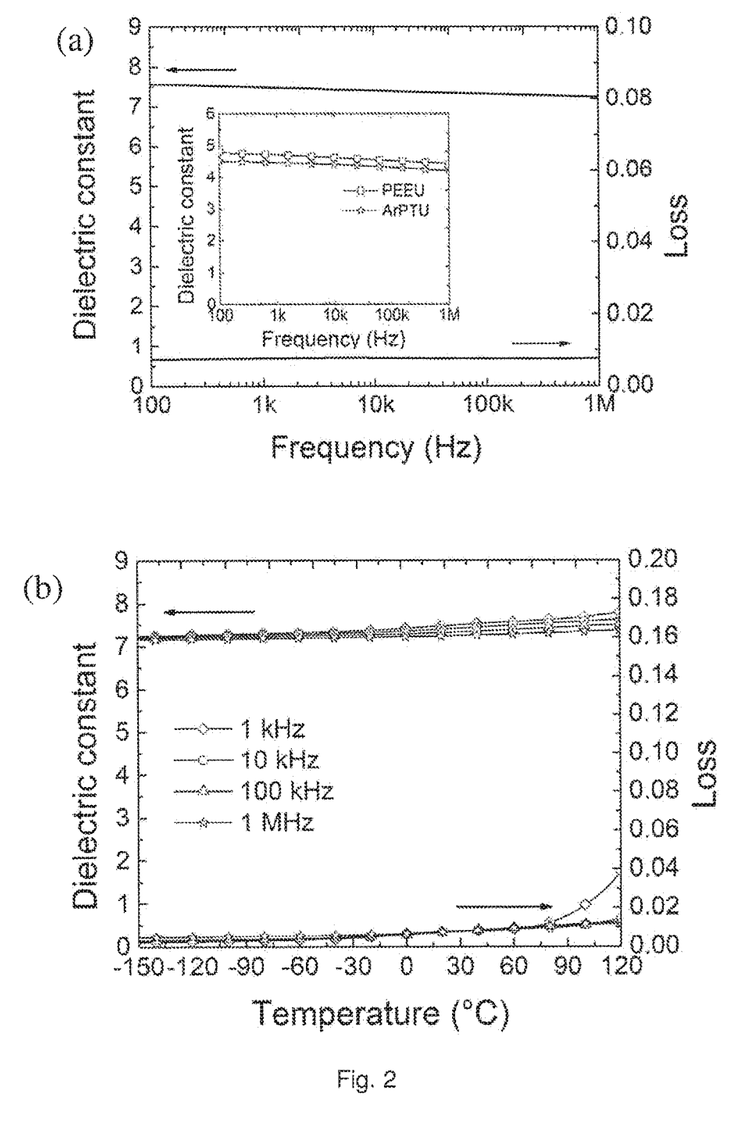
FIGS. 2a and 2b are graphs showing dielectric data of the 1:1 blend of PEEU and ArPTU as a (a) function of frequency at room temperature, including the inset which shows the dielectric data of PEEU and ArPTU (b) as a function of temperature.
Figure 3:
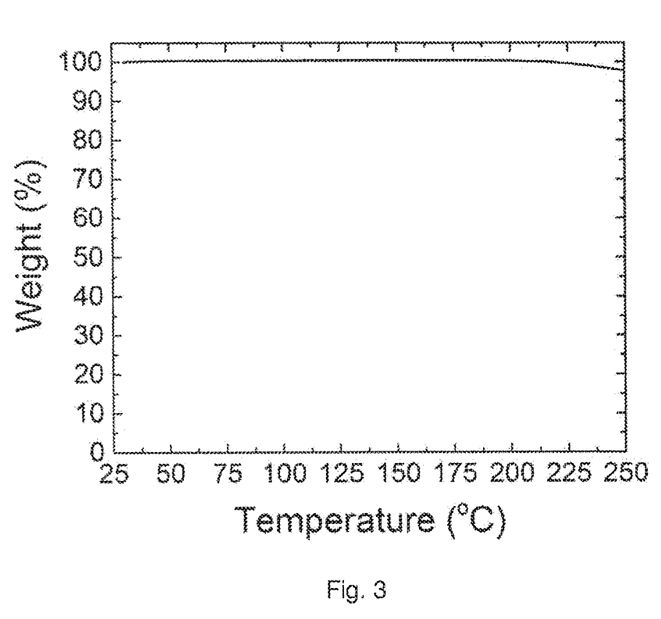
FIG. 3 is TGA data of 1:1 PEEU:ArPTU blend showing thermal stability up to 250° C.

FIG. 2 and Table 2 show the dielectric constant and loss of ArPTU and PEEU at 1 kHz. A 1:1 blend (by weight) of the two polymer shows a higher dielectric constant (K=7.5) while maintaining a low loss and high operating temperature (to about 125° C.), see FIG. 2 and Table 2. Thermal gravimetric analysis (TGA) data in FIG. 3 shows no weight loss below 250° C., thus confirming the thermal stability up to 250° C., which is a very desirable feature for high temperature operation.

TABLE 2

Summary of the dielectric properties of dipolar polymers: PEEU, ArPTU, and their blends

| Polymer | Dielectric Constant (1 kHz) | Loss (1 kHz) |
| --- | --- | --- |
| PEEU | 4.7 | 1.1% |
| ArPTU | 4.4 | 0.64% |
| Blend (1:1) | 7.5 | 0.77% |
| Blend (1:2) | 7.9 | 1.62% |
| Blend (1:3) | 8.6 | 1.84% |
| Blend (2:1) | 8.3 | 1.45% |
| Blend (3:1) | 7.4 | 1.35% |

It is remarkable that a blend of two dipolar polymers, one with dielectric constant of 4.7 and the other with dielectric constant of 4.4, can lead to a large increase (an increase of over 50%) of the dielectric constant of the blend (to 7.5) without causing significant adverse changes in the dielectric loss. This opens up a totally new and low cost method to fabricate high dielectric constant polymers. In an embodiment of the present disclosure, the dielectric composition has a dielectric constant that is greater than 25%, e.g., greater than 30%, 40%, 50% or 60%, than any individual dipolar polymers in the blend.

Grazing incidence X-ray scattering data of the ArPTU: PEEU blend reveal: (i) there is only one broad X-ray diffraction peak for the 1:1 blend; (ii) the broad X-ray peak for the blend is at ca. 2θ=17°, indicating that interchain spacing in the blend is more than 5% larger than those of the individual polymers. The expanded interchain spacing in the blend enables easier dipole reorientation to the applied field and leads to a higher dielectric constant compared with those of the neat polymers while maintaining low dielectric loss. AFM images of the blend with 1:1 PEEU:ArPTU ratio show uniform mixing of the two polymers in the blend at the nanoscale. These results indicate that the reduced constraints achieved by molecular engineering of the dipolar polymers in the glassy phase can significantly increase the dielectric constant without compromising the dielectric loss.

In another aspect of the present disclosure, the dielectric capacitor comprises a dielectric composition comprising a dipolar polymer and interfacial agent. The dielectric composition includes a dipolar polymer having a high glass transition temperature (e.g., $T_g$≥150° C.) with an inorganic interfacial agent. Useful dipolar polymers for the dielectric compositions modified with an interfacial agent are as described above and include one or more dipolar polymers preferably have a dielectric constant of at least 3.0. The inorganic interfacial agents are electrically insulating. In certain embodiments, interfacial agents can be selected from one or more of: interfacial agents of dielectric insulators $Al_2O_3$, $MgO$, $ZrO_2$, $BN$, $SiO_2$, $ZnO$, $Ta_2O_5$, $TiO_2$, $HfO_2$, $HfSiO_4$, $La_2O_3$, $Y_2O_3$, $BaTiO_3$, BSTZ $(Ba_{0.8}Sr_{0.2})(Ti0_.9Zr_0.1)O_3$ or combinations thereof. Advantageously, the interfacial agent is present in a small volume fraction of the dielectric composition. In some embodiments, the volume fraction of the interfacial agent in the dielectric composition is less than 2 vol %, e.g., less than 1 vol %, or no more than about 0.8 vol % or 0.5 vol % of the dielectric composition. The interfacial agent can also have an average size of no more than about 100 nm, such as no more than 50 nm, and no more than 40 nm. As explained further below, the volume fraction is dependent on the interfacial agent size.

Based on the same consideration explained for blends, inorganic interfacial agents in the glass phase of dipolar polymers may also create the excess free-volume effect at the interface regions of the polymers which increases the dielectric response of dipoles in the interface regions. The large interface areas in the dielectric compositions surrounding the interfacial agents could result in a large increase of the dielectric constant while maintaining the low dielectric loss at temperatures below $T_g$.

Figure 4:
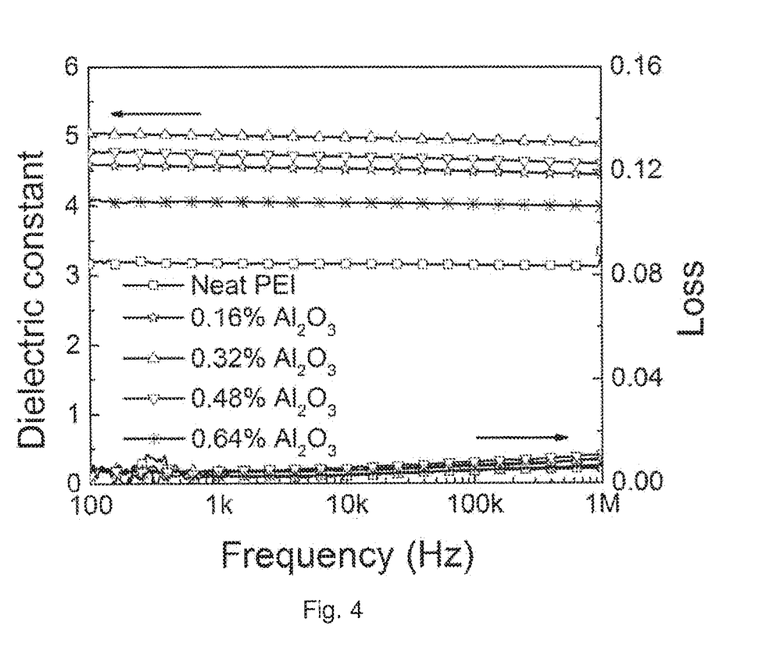
FIG. 4 shows dielectric properties of PEI/Alumina dielectric composition at different alumina interfacial agent loading in vol. % (20 nm size) vs frequency measured at 1 kHz and room temperature. Alumina has a density of 3.95 g/cc and PEI density at room temperature is 1.27 g/cc. 0.322 vol % of alumina loading is equal to 1 wt. %.

As shown in FIG. 4, polyetherimide (PEI) with $Al_2O_3$ (alumina) interfacial agents (20 nm and dielectric constant=9.5) displays a significantly increased dielectric constant while maintaining a low dielectric loss. The dielectric constant of the dielectric compositions increases with the $Al_2O_3$ loading until 1 wt % (0.32 vol %). After that, increasing $Al_2O_3$ interfacial agents causes the dielectric constant to decrease and at high $Al_2O_3$ interfacial agents loading (5 volume % of $Al_2O_3$), the dielectric constant of the dielectric compositions becomes nearly the same as that of the PEI matrix. The results indicate that there is certain composition range in order to realize the free-volume effect and significantly increase the dielectric constant in the glass phase of dipolar polymers.

It is remarkable that with about 0.3 vol % of alumina interfacial agents (20 nm particle size), the dielectric constant of the dielectric compositions of PEI with alumina can be increased by about 50% without causing any significant increase in the dielectric loss. This dielectric composition based excess free-volume effect creates a low cost and easy fabrication approach for enhancing the dielectric constant of a broad range of dipolar polymers while maintaining a low dielectric loss.

Figure 5:
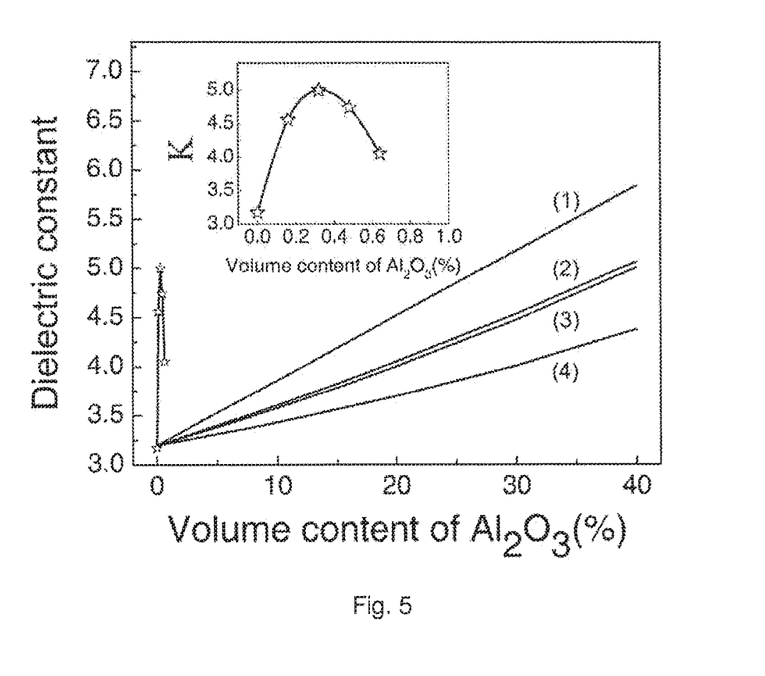
FIG. 5 is a graph depicting dielectric constants of dielectric composition films of PEI/alumina (20 nm particle size) vs. interfacial agent volume content and comparison with several widely used dielectric models of dielectric polymer (PEI) with different alumina loading in vol. % (lines 1, 2, 3, 4, with no data points).
Figure 6:
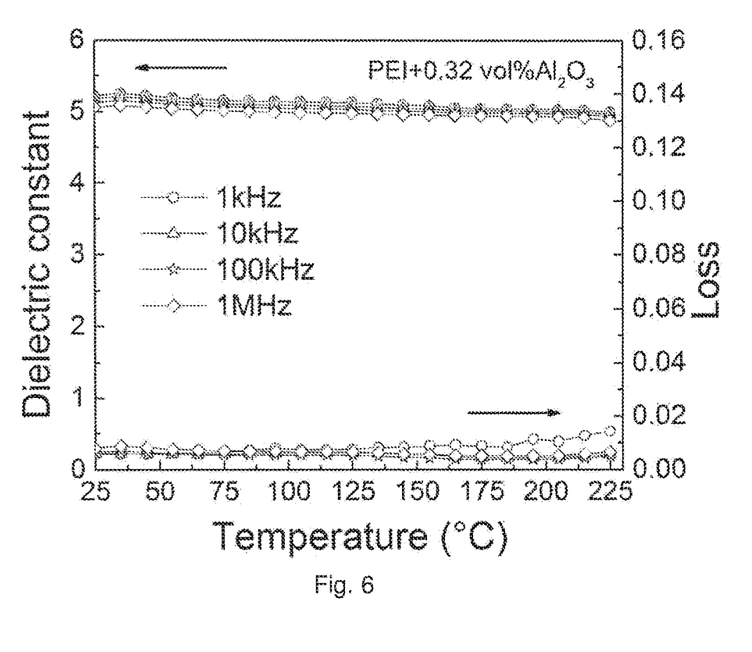
FIG. 6 is a graph showing dielectric properties vs. temperature of dielectric compositions with 1 wt % (0.32 vol %) of alumina loading in PEI.

The improvement in the dielectric constant of a dielectric composition by using such a small volume percent of interfacial agents with one or more dipolar polymers is surprising and unexpected. For example, FIG. 5 depicts the dielectric constant of the dielectric compositions vs. alumina volume content, which displays a sharp increase in the dielectric constant with alumina interfacial agent loading and reaches K>5 at 0.32 vol. %. Moreover, this large increase in the dielectric constant occurs in a small and narrow composition range. With additional interfacial agent, the dielectric constant decreases, and at 0.64 vol. % the dielectric constant K of the film is 4. It is surprising that the large enhancement in the dielectric response of PEI/alumina (20 nm size) dielectric compositions occurs at such low interfacial agent volume content. For comparison, FIG. 5 further depicts experimental data with several widely-applied dielectric composite models using the dielectric properties of PEI and alumina. Curve (1) uses the Parallel model; curve (2) uses the Maxwell model; curve (3) uses the Lichtenecker model; and curve (4) uses the series model. See Yoon, D.-H., Zhang, J. & Lee, B. I. Dielectric constant and mixing model of $BaTiO_3$ composite thick films. *Mater. Res. Bull.* 38, 765-772 (2003); Barrow, et al., Characterization of thick lead zirconate titanate films fabricated using a new sol gel based process. *J. Appl. Phys.* 81, 876-881 (1997); Liu, W.-D., Zhu, B.-K., Zhang, J. & Xu, Y.-Y. Preparation and dielectric properties of polyimide/silica dielectric composition films prepared from sol-gel and blending process. *Polym. Adv. Technol.* 18, 522-528 (2007). The inset graph in FIG. 5 shows an expanded view of the dielectric constants of the dielectric composition films vs. alumina loading. None of these models can describe the observed phenomenon; in fact, at present, there is no theory that can explain the observed large increase in the dielectric constant of dielectric compositions at such low volume content of insulating interfacial agents. The dielectric properties of the dielectric compositions with 1 wt % (0.32 vol %) alumina loading vs. temperature, up to 225° C., are shown in FIG. 6, which is nearly a constant from room temperature (25° C.) to $T_g$. The results demonstrate the high performance of the dielectric compositions which have much higher dielectric constant while maintaining a low dielectric loss that is similar to PEI matrix.

Figure 7:
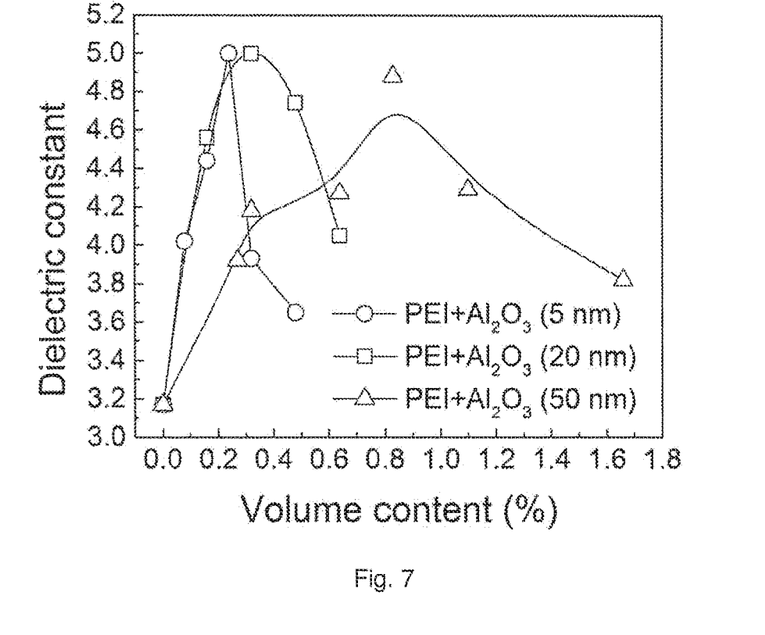
FIG. 7 is a graph showing the effect of interfacial agent size on the dielectric response (at 1 kHz) of PEI/alumina composite film vs interfacial agent volume content.

To investigate the effect of interfacial agent size on the dielectric response of PEI dielectric compositions, PEI dielectric compositions with alumina agents of 5 nm and 50 nm diameters were prepared and characterized. As shown in FIG. 7 (and Table 3), the peak position of the dielectric enhancement shifts to higher interfacial agent volume content with agent size for these compositions. For PEI/alumina (5 nm) dielectric compositions, the peak is at 0.24 vol. % with the dielectric constant K=5, while for PEI/alumina (50 nm) dielectric compositions the peak is at ca. 0.8 vol. % with the K near 4.9.

TABLE 3

Summary of dielectric data of polyetherimide (PEI) dielectric composition films at room temperature (1 wt % = 0.32 vol %)

| | Dielectric constant (1 kHz) | Loss (1 kHz) |
|---|---|---|
| Neat Polymer Film | | |
| Neat PEI | 3.17 | 0.29% |
| Dielectric composition Film | | |
| *PEI with $Al_2O_3$ (5 nm)* | | |
| PEI + 0.08% $Al_2O_3$ (5 nm) (by vol.) | 4.02 | 0.48% |
| PEI + 0.16% $Al_2O_3$ (5 nm) (by vol.) | 4.44 | 0.38% |
| PEI + 0.24% $Al_2O_3$ (5 nm) (by vol.) | 5.0 | 0.42% |
| PEI + 0.32% $Al_2O_3$ (5 nm) (by vol.) | 3.93 | 0.25% |
| PEI + 0.48% $Al_2O_3$ (5 nm) (by vol.) | 3.65 | 0.15% |
| *PEI with $Al_2O_3$ (20 nm)* | | |
| PEI + 0.16% $Al_2O_3$ (20 nm) (by vol.) | 4.56 | 0.46% |
| PEI + 0.32% $Al_2O_3$ (20 nm) (by vol.) | 5.0 | 0.46% |
| PEI + 0.48% $Al_2O_3$ (20 nm) (by vol.) | 4.74 | 0.5% |
| PEI + 0.64% $Al_2O_3$ (20 nm) (by vol.) | 4.05 | 0.27% |
| PEI + 1.28% $Al_2O_3$ (20 nm) (by vol.) | 4.01 | 0.68% |
| PEI + 1.63% $Al_2O_3$ (20 nm) (by vol.) | 3.93 | 0.61% |
| *PEI with MgO (20 nm)* | | |
| PEI + 0.17% MgO (20 nm) (by vol.) | 4.36 | 0.55% |
| PEI + 0.35% MgO (20 nm) (by vol.) | 4.95 | 0.23% |
| PEI + 0.70% MgO (20 nm) (by vol.) | 4.09 | 0.49% |
| *PEI with $SiO_2$ (20 nm)* | | |
| PEI + 0.26% $SiO_2$ (20 nm) (by vol.) | 4.88 | 0.24% |
| PEI + 0.79% $SiO_2$ (20 nm) (by vol.) | 3.84 | 0.43% |
| *PEI with $Al_2O_3$ (50 nm)* | | |
| PEI + 0.27% $Al_2O_3$ (50 nm) (by vol.) | 3.92 | 0.63% |
| PEI + 0.32% $Al_2O_3$ (50 nm) (by vol.) | 4.18 | 0.29% |
| PEI + 0.64% $Al_2O_3$ (50 nm) (by vol.) | 4.27 | 0.35% |
| PEI + 0.83% $Al_2O_3$ (50 nm) (by vol.) | 4.88 | 0.43% |
| PEI + 1.1% $Al_2O_3$ (50 nm) (by vol.) | 4.29 | 0.61% |
| PEI + 1.66% $Al_2O_3$ (50 nm) (by vol.) | 3.82 | 0.53% |
| *PEI with $BaTiO_3$ (50 nm)* | | |
| PEI + 0.16% $BaTiO_3$ (50 nm) (by vol.) | 3.77 | 0.35% |
| PEI + 0.32% $BaTiO_3$ (50 nm) (by vol.) | 3.94 | 0.43% |
| PEI + 0.48% $BaTiO_3$ (50 nm) (by vol.) | 4.18 | 0.23% |
| PEI + 0.64% $BaTiO_3$ (50 nm) (by vol.) | 4.36 | 0.24% |
| PEI + 0.80% $BaTiO_3$ (50 nm) (by vol.) | 4.88 | 0.40% |
| PEI + 0.96% $BaTiO_3$ (50 nm) (by vol.) | 4.44 | 0.45% |
| *PEI with BN (70 nm)* | | |
| PEI + 0.27% BN (70 nm) (by vol.) | 3.73 | 0.25% |
| PEI + 0.55% BN (70 nm) (by vol.) | 3.97 | 0.58% |
| PEI + 0.83% BN (70 nm) (by vol.) | 4.71 | 0.89% |
| PEI + 1.1% BN (70 nm) (by vol.) | 4.55 | 0.19% |
| PEI + 1.66% BN (70 nm) (by vol.) | 4.21 | 0.18% |

In addition, the composition range in which the dielectric enhancement occurs is broader for larger-size interfacial agents. For a dielectric composition, the interfacial surface areas of the interfacial agents is inversely proportional to $1/d_n$ where $d_n$ is the interfacial agent size for a given vol % of the interfacial agents in the dielectric composition. The dielectric peak shifts to a larger interfacial agent volume content with an increase in agent size from 5 nm to 50 nm due to a reduced surface-area-to-volume ratio. Hence, for interfacial effects, large size interfacial agents need higher volume content to reach a similar interfacial area surrounding the same dielectric response interfacial agents.

Figure 8:
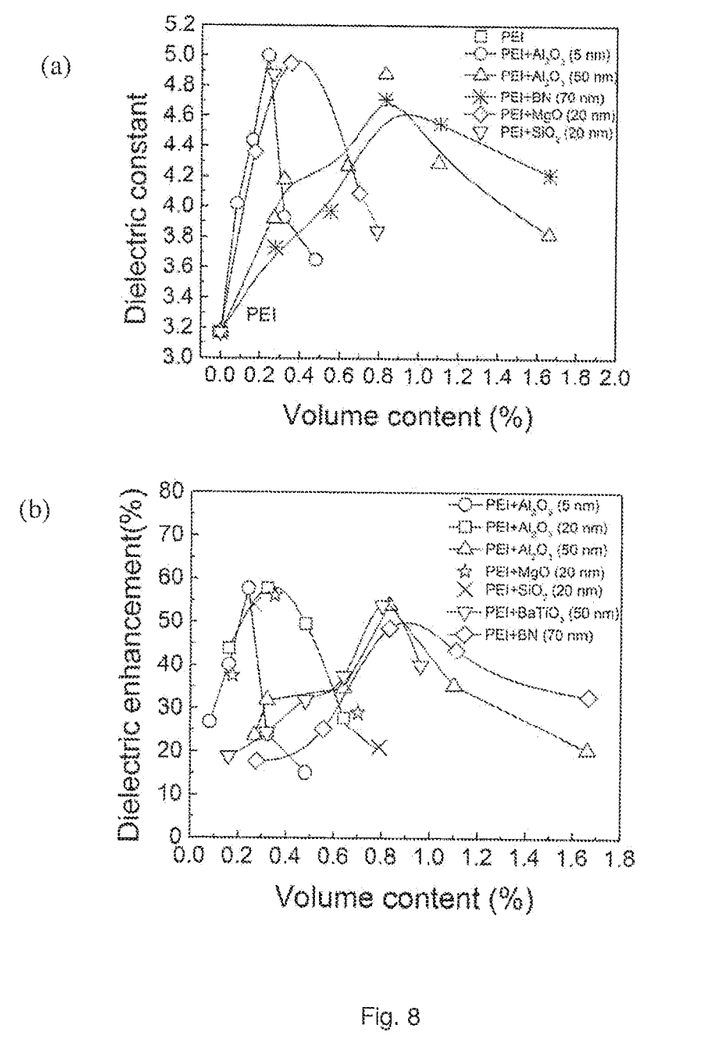
FIGS. 8a and 8b are graphs which (a) summarize dielectric constant data of PEI dielectric compositions with different interfacial agents (20 nm MgO; 20 nm $SiO_2$; 20 nm $Al_2O_3$; 50 nm $BaTiO_3$; 70 nm BN); (b) summarize dielectric constants of the various dielectric compositions studied. The data are presented as percentage increase of the dielectric constant of the dielectric compositions with respect to the original polymer matrix. Experimental data points are shown and lines are drawn to guide the eye.

We also investigated whether the observed enhancement in dielectric response occurs with other interfacial agents. PEI films with 20 nm size $SiO_2$ (K=3.9) and MgO (K=9.7) were prepared and characterized. Dielectric constants measured at room temperature and 1 kHz are presented in FIG. 8a and Table 3. For example, PEI/MgO films show a dielectric constant of 4.95 (and maximum enhancement at 0.35 vol. % MgO content). At 0.7 vol. %, the dielectric constant of the composite is reduced to 4.1, a trend very similar to that observed in PEI/alumina dielectric compositions, i.e., a significantly enhanced dielectric response at very low interfacial agent loading. It is interesting to note that the PEI/$SiO_2$ dielectric composition has a dielectric constant K~5, which is higher than both the pure polymer matrix and the interfacial agent. In addition, dielectric compositions with boron nitride of 70 nm size (hexagonal BN, dielectric constant~5-7 and dielectric loss<0.2%) were also prepared and characterized. As shown in FIG. 8a and Table 3, the PEI/BN films display an enhanced dielectric constant, peaking at ca. 0.83 vol. % with K=4.7 and displaying low dielectric loss (Table 3). These results indicate that the enhanced dielectric constant in the PEI films does not strongly depend on the interfacial agent type.

Figure 9:
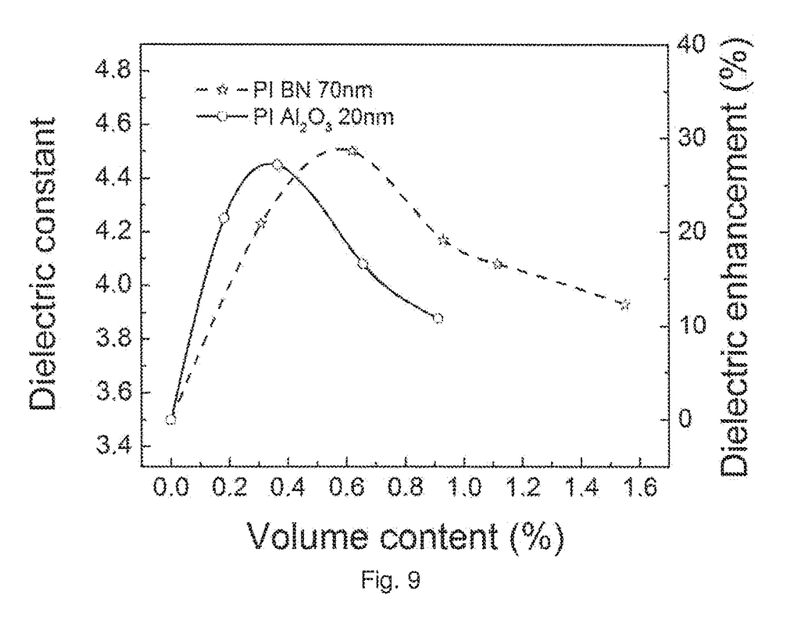
FIG. 9 is a graph showing dielectric constants measured at 1 kHz and room temperature vs. the volume content of the interfacial agent for PI dielectric compositions. Data points are shown and curves are drawn to guide the eye.

We note that PEI dielectric compositions with high dielectric constant $BaTiO_3$ (BTO) interfacial agent (50 nm particle size, K>500) have been investigated earlier. To reach a dielectric constant of K=5, required more than 12 vol. % BTO interfacial agent. We prepared PEI/BTO (50 nm) dielectric compositions at very low volume content. As presented in FIG. 8a and Table 3, the dielectric response of PEI/BTO (50 nm) is nearly the same as that of PEI/alumina (50 nm) in spite of the large difference in interfacial agent's dielectric constant, i.e., the peak enhancement (K=4.9) is at ca. 0.8 vol. %. FIG. 9b summarizes all of the dielectric composition experimental data in terms of percentage enhancement in the dielectric constant of the dielectric compositions, compared with that of the pure polymer matrix, showing more than 50% enhancement in the dielectric compositions depicted. Table 3 summarizes the dielectric properties of the dielectric compositions of PEI/alumina of different size and composition, measured at room temperature. Within the experimental error (±0.2% in loss), there is no change of the dielectric loss with the alumina loading in the dielectric compositions.

In addition to PEI dielectric compositions, data for dielectric compositions of polyimide, another dipolar polymer with high $T_g$, with alumina interfacial agents of 20 nm and 50 nm, respectively, are also provided. The results are presented in FIG. 9 and Table 4. Analogous to PEI dielectric compositions, the PI dielectric compositions also exhibit an enhanced dielectric constant occurring at very low volume content. The PI/alumina (20 nm) composites show a peak at ca. 0.3 vol. %, while PI/alumina (50 nm) dielectric compositions have the peak at ca. 0.6 vol. %, although the enhancement in the dielectric constant is smaller. PI/alumina dielectric compositions exhibit a peak enhancement of about 30%, compared with PEI/alumina dielectric compositions enhancement of near 60%.

TABLE 4

Summary of dielectric data of polyimide (PI) dielectric composition films

| | Dielectric constant (1 kHz) | Loss (1 kHz) |
|---|---|---|
| Neat Polymer Film | | |
| Neat PI | 3.5 | 0.5% |
| Dielectric composition Film | | |
| PI with $Al_2O_3$ (20 nm) | | |
| PI + 0.18% $Al_2O_3$ (20 nm) (by vol.) | 4.22 | 0.50% |
| PI + 0.36% $Al_2O_3$ (20 nm) (by vol.) | 4.45 | 0.69% |
| PI + 0.65% $Al_2O_3$ (20 nm) (by vol.) | 4.08 | 0.75% |
| PI + 0.91% $Al_2O_3$ (20 nm) (by vol.) | 3.88 | 0.62% |
| PI with BN (70 nm) | | |
| PI + 0.31% BN (70 nm) (by vol.) | 4.23 | 0.74% |
| PI + 0.62% BN (70 nm) (by vol.) | 4.48 | 0.76% |
| PI + 0.93% BN (70 nm) (by vol.) | 4.17 | 0.79% |
| PI + 1.11% BN (70 nm) (by vol.) | 4.08 | 0.87% |
| PI + 1.55% BN (70 nm) (by vol.) | 3.93 | 0.74% |

Figure 10:
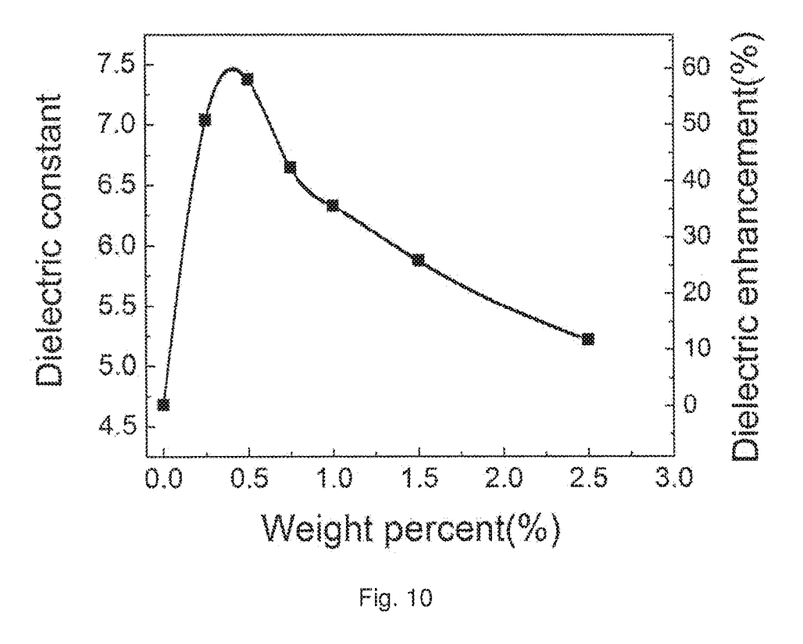
FIG. 10 is a graph showing dielectric constants measured at 1 kHz and room temperature vs. the weight content of the interfacial agent for PEEU dielectric compositions. Data points are shown and a curve is drawn to guide the eye.

The effect is not limited to polymer imides but it is applicable to other dipolar polymers as well, such as polyurea (PEEU), see FIG. 10. PEEU/alumina dielectric compositions show a peak enhancement of 58%, resulting in the dielectric constant of 7.38. The PEEU dielectric composition data is summarized in Table 5. Thus confirming the universal application of interfacial agents with dipolar polymers to form the dielectric compositions according to the present disclosure.

TABLE 4

Summary of dielectric data of polyaryleneetherurea (PEEU) dielectric composition films

| | Dielectric constant (1 kHz) | Loss (1 kHz) |
|---|---|---|
| Neat polymer film | | |
| Neat PEEU | 4.68 | 1.2% |
| Dielectric composition film | | |
| PEEU with $Al_2O_3$ (20 nm) | | |
| PEEU + 0.25% $Al_2O_3$ (by wt.) | 7.04 | 1.7% |
| PEEU + 0.5% $Al_2O_3$ (by wt.) | 7.38 | 1.7% |
| PEEU + 0.75% $Al_2O_3$ (by wt.) | 6.66 | 2.1% |
| PEEU + 1% $Al_2O_3$ (by wt.) | 6.33 | 2.0% |
| PEEU + 1.5% $Al_2O_3$ (by wt.) | 5.88 | 1.9% |
| PEEU + 2.5% $Al_2O_3$ (by wt.) | 5.23 | 1.5% |

Figure 11:
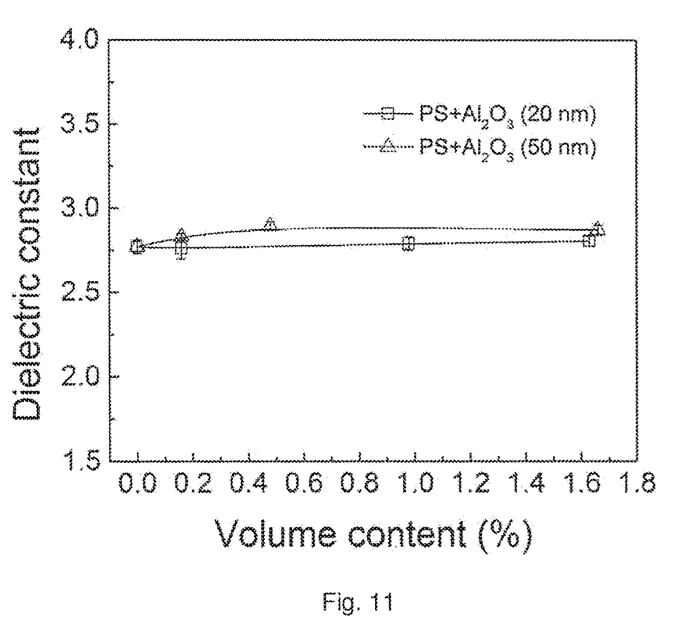
FIG. 11 is a graph showing dielectric constants measured at 1 kHz and room temperature vs. the interfacial agent content for PS dielectric compositions. Data points are shown and solid curves are drawn to guide the eye.

In contrast, dielectric compositions of a non-polar polymer, polystyrene, with alumina interfacial agents of 20 nm and 50 nm, respectively, do not show dielectric enhancement, see FIG. 11 and Table 5. Hence, the dielectric compositions should include one or more dipolar polymers to realize the benefits of the present disclosure.

TABLE 5

Summary of dielectric data of non-polar polystyrene (PS) dielectric composition films

|  | Dielectric constant (1 kHz) | Loss (1 kHz) |
|---|---|---|
| Neat Polymer Film | | |
| Neat PS | 2.77 ± 0.04 | 0.30% |
| Dielectric composition Film | | |
| PS with Al$_2$O$_3$ (20 nm) | | |
| PS + 0.16% Al$_2$O$_3$ (20 nm) (by vol.) | 2.76 ± 0.06 | 0.13% |
| PS + 0.98% Al$_2$O$_3$ (20 nm) (by vol.) | 2.79 ± 0.03 | 0.14% |
| PS + 1.63% Al$_2$O$_3$ (20 nm) (by vol.) | 2.80 ± 0.03 | 0.43% |
| PS with Al$_2$O$_3$ (50 nm) | | |
| PS + 0.16% Al$_2$O$_3$ (50 nm) (by vol.) | 2.83 ± 0.02 | 0.33% |
| PS + 0.48% Al$_2$O$_3$ (50 nm) (by vol.) | 2.89 ± 0.02 | 0.27% |
| PS + 1.66% Al$_2$O$_3$ (50 nm) (by vol.) | 2.87 ± 0.03 | 0.24% |

Figure 12:
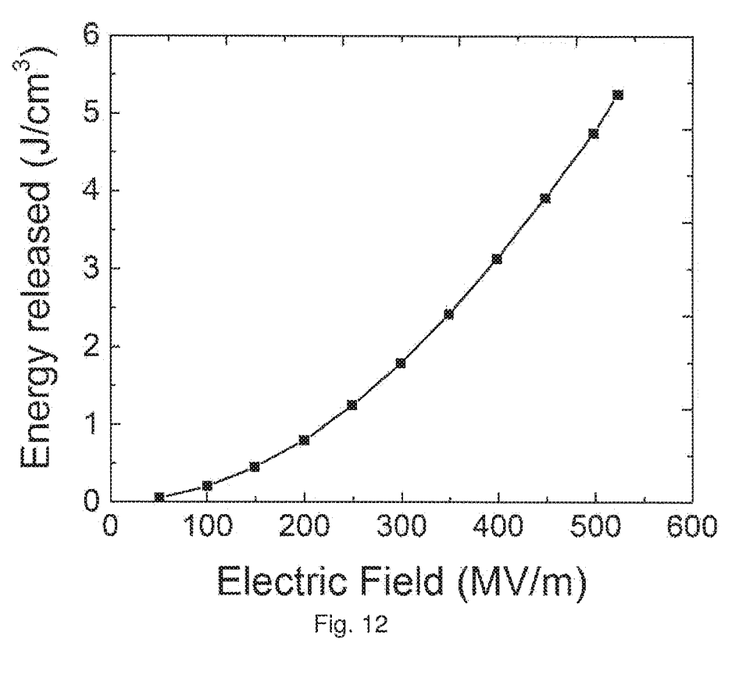
FIG. 12 is a graph showing energy released calculated from the P-E loop data of PEI with 1 wt % (0.32 vol %) of alumina loading at room temperature.

An advantage of low volume percentage loading of dielectric compositions is that the breakdown field does not get compromised. FIG. 12 shows the energy released (calculated from P-E loop) as a function of field for PEI with 1 wt % (0.32 vol %) alumina loading at room temperature. The films maintain a high AC breakdown field of >450 MV/m, with highest breakdown field of 525 MV/m resulting in the released energy density of 5.25 J/cm$^3$.

As explained throughout, the inorganic interfacial agents in the dielectric compositions should be electrically insulators. Further, it is preferable that the dielectric constant of the interfacial agents not be high compared with the polymer matrix so as to avoid local electric fields that can build-up around the interfacial agents, which can be much higher than the average electric field experienced by the dielectric composition. Thus, use of high dielectric constant inorganic interfacial agents at high volume fraction (>2 vol. %) and the built-up of local electric fields can cause reduction of the dielectric strength of the polymer dielectric compositions in some instance compared with the dipolar polymer alone. Hence in some embodiments, the volume fraction of the interfacial agent in the dielectric composition is less than 2 vol %, e.g., less than 1 vol %, or no more than about 0.8 or 0.5 vol % of the dielectric composition.

Analogously, the enhanced dielectric response by the excess free volume effect in dipolar polymer blends will also depend on the chemical and physical properties such as the polymer chemical and molecular compositions of the two polymers in the blends.

The polymer blend films can be fabricated by either solution cast method. In this method, two dipolar polymers with a weight ratio (determines the blend composition) are dissolved thoroughly in a common solvent. Density of both polymers are close to each other, around 1.32 g/cc, therefore weight ratio and volume ratio can be used interchangeably. Blend films can be produced using commercial slot die casting process (tape casting). The slot die has a narrow gap and the filtered polymer blend solution prepared is pushed through the gap and cast onto a moving plastic or stainless steel belt. The carrier brings the wet film through a multi-stage drying oven to fully remove the solvent. The dry film can be peeled off and rewound at the end of the process. To ensure the thickness uniformity, a high precision metering pump is usually used to provide constant and stable solution feeding. The blend films can also be fabricated using the melt extrusion method. In this method, the polymer powders of the two polymers in the blend are mixed with a proper ratio, corresponding to the desired weight ratio between the two in the blend. The mixed polymer powder is then fed through the extruder to produce dielectric compositions as films.

Analogously, the dielectric composition films can also be produced using either the solution cast method or the melt extrusion method. In the solution cast method, a dipolar polymer is dissolved in a solvent and then the inorganic interfacial agents in a given weight, corresponding to the wt % or vol % of the interfacial agents in the composite, are added to the polymer solution. The solution can be used to produce dielectric composition films. Analogously, the polymer powder and inorganic interfacial agent as a powder are mixed with a proper ratio. The mixed powder is then fed through an extruder to form dipolar polymer and interfacial agent films.

Having described the invention in detail and by reference to specific embodiments thereof, it will be apparent that modifications and variations are possible without departing from the scope of the invention defined in the appended claims. More specifically, although some aspects of the present invention are identified as preferred or particularly advantageous, it is contemplated that the present invention is not necessarily limited to these preferred aspects of the invention.

What is claimed is:

1. A dielectric capacitor comprising a dielectric composition comprising:
   a blend of at least two dipolar polymers and an interfacial agent, each dipolar polymer having a glass transition temperature ($T_g$) of at least 150° C., and the interfacial agent present in the amount of less than 2 vol %,
   wherein the blend has a dielectric constant that is at least 40% higher than the dielectric constant of any one of the at least two dipolar polymers and a dielectric loss less than 0.01 when the dielectric loss is measured at any temperature between −50° C. and the $T_g$ of any one of the two dipolar polymers.

2. The dielectric capacitor of claim 1, wherein the blend of at least two dipolar polymers includes polymer A and polymer B, wherein
   polymer A is selected from meta-phenylene polyurea (meta-PU), poly(arylene ether urea) (PEEU), aromatic polyurea (ArPU), aromatic polythiourea (ArPTU), Polycarbonate (PC), Polyetheretherketone (PEEK), Polyetherimide (PEI), Polyimide (PI), Polyether sulfone (PES), Polyphenylsulfone (PPSU), Polysulfone (PSU), Polybenzimidazole (PBI), Poly(phthalazinone ether ketone) (PPEK);
   polymer B is selected from meta-phenylene polyurea (meta-PU), poly(arylene ether urea) (PEEU), aromatic polyurea (ArPU), aromatic polythiourea (ArPTU), Polycarbonate (PC), Polyetheretherketone (PEEK), Polyetherimide (PEI), Polyimide (PI), Polyether sulfone (PES), Polyphenylsulfone (PPSU), Polysulfone (PSU), Polybenzimidazole (PBI), Poly(phthalazinone ether ketone) (PPEK), and
   polymer A is different from polymer B.

3. The dielectric capacitor of claim 1, wherein the blend of dipolar polymers includes polymer A with polymer B and wherein the volume fraction of polymer A in the blend is x, the volume fraction of polymer B in the blend is (1-x), and x ranges from 0.1 to 0.9.

4. The dielectric capacitor of claim 1, wherein the blend is fabricated by solution casting the blend into a film.

5. The dielectric capacitor of claim 1, wherein the blend is fabricated by melt extrusion into a film.

6. A dielectric composition comprising a blend of at least two dipolar polymers and an interfacial agent, each dipolar polymer having a glass transition temperature ($T_g$) of at least 150° C., and the interfacial agent present in the amount of less than 2 vol %,
wherein the blend has a dielectric constant that is at least 40% higher than the dielectric constant of any one of the at least two dipolar polymers and a dielectric loss less than 0.01 when the dielectric loss is measured at any temperature between −50° C. and the $T_g$ of any one of the two dipolar polymers and the dielectric composition is in the form of a thin film.

7. The dielectric composition of claim 6, wherein the blend of at least two dipolar polymers includes polymer A and polymer B, wherein:
polymer A is selected from meta-phenylene polyurea (meta-PU), poly(arylene ether urea) (PEEU), aromatic polyurea (ArPU), aromatic polythiourea (ArPTU), Polycarbonate (PC), Polyetheretherketone (PEEK), Polyetherimide (PEI), Polyimide (PI), Polyether sulfone (PES), Polyphenylsulfone (PPSU), Polysulfone (PSU), Polybenzimidazole (PBI), Poly(phthalazinone ether ketone) (PPEK);
polymer B is selected from meta-phenylene polyurea (meta-PU), poly(arylene ether urea) (PEEU), aromatic polyurea (ArPU), aromatic polythiourea (ArPTU), Polycarbonate (PC), Polyetheretherketone (PEEK), Polyetherimide (PEI), Polyimide (PI), Polyether sulfone (PES), Polyphenylsulfone (PPSU), Polysulfone (PSU), Polybenzimidazole (PBI), Poly(phthalazinone ether ketone) (PPEK), and
polymer A is different from polymer B.

8. The dielectric composition of claim 6, wherein the blend of dipolar polymers includes polymer A with polymer B and wherein the volume fraction of polymer A in the blend is x, the volume fraction of polymer B in the blend is (1−x), and x ranges from 0.1 to 0.9.

9. The dielectric composition of claim 6, wherein the interfacial agent is selected from one or more of: interfacial agents of dielectric insulators $Al_2O_3$, MgO, $ZrO_2$, BN, $SiO_2$, ZnO, $Ta_2O_5$, $TiO_2$, $HfO_2$, $HfSiO_4$, $La_2O_3$, $Y_2O_3$, $BaTiO_3$, BSTZ $(Ba_{0.8}Sr_{0.2})(Ti_{0.9}Zr_{0.1})O_3$ or combinations thereof.

10. The dielectric capacitor of claim 1, wherein the interfacial agent is selected from one or more of: interfacial agents of dielectric insulators $Al_2O_3$, MgO, $ZrO_2$, BN, $SiO_2$, ZnO, $Ta_2O_5$, $TiO_2$, $HfO_2$, $HfSiO_4$, $La_2O_3$, $Y_2O_3$, $BaTiO_3$, BSTZ $(Ba_{0.8}Sr_{0.2})(Ti_{0.9}Zr_{0.1})O_3$ or combinations thereof.

* * * * *